Patented Jan. 12, 1932

1,840,321

UNITED STATES PATENT OFFICE

ALBERT KISSLING, OF FRANKFORT-ON-THE-MAIN-HOCHST, ERNST HOTZ, OF HATTERS-HEIM, NEAR FRANKFORT-ON-THE-MAIN, AND WILHELM FITZKY, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

QUANTITATIVE SEPARATION OF A MIXTURE OF 2-HALOGEN-3-CHLORO- AND 2-HALOGEN-5-CHLORO-4-AMINO-1-METHYLBENZENES

No Drawing. Application filed August 6, 1929, Serial No. 383,976, and in Germany September 7, 1928.

The present invention relates to the quantitative separation of a mixture of 2-halogen-3-chloro- and 2-halogen-5-chloro-4-amino-1-methylbenzenes of the following general constitutions:

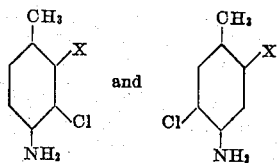

wherein X stands for a chlorine or a bromine atom.

We have found that the 2-halogen-5-chloro-4-amino-1-methyl-benzenes cannot be sulfonated in any way, whereas the 2-halogen-3-chloro-4-amino-1-methyl-benzenes can be easily sulfonated forming according to the conditions observed during the reaction the one or the other of the two possible sulfonic acids. Thus for instance the 2-halogen-3-chloro-4-amino-1-methyl-benzene-5-sulfonic acids are obtained by treating the 2-halogen-3-chloro-4-amino-1-methyl-benzenes with concentrated sulfuric acid at a temperature of about 170° C. to 200° C. or by causing one molecular proportion of the said compound dissolved in concentrated sulfuric acid to react with one molecular proportion of sulfuric anhydride dissolved in concentrated sulfuric acid.

We have furthermore found that the sulfo group can easily be split off again from the 2-halogen-3-chloro-4-amino-1-methyl-benzene-5-sulfonic acids by heating the latter with moderately diluted sulfuric acid according to known methods.

The quantitative separation of the above-named mixture consisting of 2-halogen-3-chloro-4-amino-1-methyl-benzene and 2-halogen-5-chloro-4-amino-1-methyl-benzene may be conducted by treating a mixture of the two isomeric bases with concentrated sulfuric acid under the conditions above given for the preparation of the 5-sulfonic acid, separating the unsulfonated portion, that is to say the 2-halogen-5-chloro-4-amino-1-methyl-benzene, from the 2-halogen-3-chloro-4-amino-1-methyl-benzene-5-sulfonic acid formed and then again splitting off the sulfo group from the latter compound.

The following examples serve to illustrate our invention but they are not intended to limit it thereto, the parts being by weight.

(1) 176 parts of a mixture consisting of 2.3-dichloro-4-amino-1-methyl-benzene and 2.5-dichloro-4-amino-1-methyl-benzene are heated for about 2 hours with 300 parts of sulfuric acid monohydrate to 170° C. to 200° C. After cooling the reaction mixture consisting of the sulfate of unaltered 2.5-dichloro-4-amino-1-methyl-benzene and 2.3-dichloro-4-amino-1-methyl-benzene-5-sulfonic acid is poured into 1000 parts of water in order to precipitate the compounds. The precipitation of the 2.5-dichloro-4-amino-1-methyl-benzene-sulfate and of the 2.3-dichloro-4-amino-1-methyl-benzene-5-sulfonic acid is completed by the addition of sodium chloride. The compounds thus precipitated are then filtered by suction and after the addition of 150 parts of sodium carbonate dissolved in 500 parts of water the unaltered 2.5-dichloro-4-amino-1-methyl-benzene is expelled from the mixture by means of steam. After cooling the sodium salt of the 2.3-dichloro-4-amino-1-methyl-benzene-5-sulfonic acid remaining in the residue is filtered by suction and introduced into 400 parts of sulfuric acid of about 80 per cent strength; thereupon the mixture is heated for about 4 hours to a temperature of from 150° C. to 170° C. in order to split off the sulfo group. After cooling, the mixture is poured into 1200 parts of water cooled by ice and the sulfate of the 2.3-dichloro-4-amino-1-methyl-benzene is salted out. From this salt the base is liberated by means of an alkali and distilled in vacuo in order to purify it. After purification the 2.3-dichloro-4-amino-1-methyl-benzene melts at 55° C.–58° C.

The mixture of 2.3-dichloro-4-amino-1-methyl-benzene and 2.5 dichloro-4-amino-1-methyl-benzene may be obtained in the following manner: 141.5 parts of 2-chloro-4-amino-1-methyl-benzene are heated with 105 parts of acetic anhydride. By this operation the acetyl compound is obtained. Thereupon about 800 to 1000 parts of water are added and the mixture thus diluted is stirred until it has become a fine suspension; 72 parts of chlorine are then introduced into this suspension while well stirring. After the chlorination is complete the resulting mixture of 2.3- and 2.5-dichloro-4-acetamino-1-methyl-benzene is filtered by suction and saponified by boiling it for some hours with 600 to 800 parts of sulfuric acid of 30 per cent strength. On cooling the mixture of the sulfates of the two isomeric dichloro-4-amino-1-methyl-benzenes crystallizes out. The mixture of the free bases is obtained in the usual manner by decomposing the sulfates by means of an alkali.

(2) 220.5 parts of a mixture consisting of 2-bromo-3-chloro-4-amino-1-methyl-benzene and 2-bromo-5-chloro-4-amino-1-methyl-benzene are heated in 400 to 500 parts of surfuric acid monohydrate for about 2 hours to 100° C. to 130° C. with 80 to 100 parts of fuming sulfuric acid containing 65 per cent of sulfuric anhydride. After cooling the mixture is poured into 1200 to 1500 parts of water. 2-bromo-5-chloro-4-amino-1-methyl-benzene-sulfate and 2-bromo-3-chloro-4-amino-1-methyl-benzene-5-sulfonic acid are precipitated. The mixture of these compounds is filtered by suction, the press cake is made into a paste with 1000 to 1500 parts of water and heated to 80° C. to 90° C., ammonia or calcined magnesia are added until there is still a slightly acid reaction to litmus paper. Thereupon about 800 parts of an organic solvent as, for instance, chlorobenzene, dichlorobenzene, tetrachloroethane etc. are added. The 2-bromo-5-chloro-4-amino-1-methyl-benzene is taken up by the organic solvent, while the 2-bromo-3-chloro-4-amino-1-methyl-benzene-5-sulfonic acid remains in the aqueous solution in the form of its ammonium- or magnesium salt. The two layers are separated, while hot, in the separating funnel and the organic solvent is distilled off from the one part of the mixture in order to obtain the 2-bromo-5-chloro-4-amino-1-methyl-benzene. The other part of the mixture, namely the aqueous solution of the ammonium- or magnesium salt of 2-bromo-3-chloro-4-amino-1-methyl-benzene-5-sulfonic acid is mixed with 100 to 150 parts of sulfuric acid of 66° Bé. and heated, without filtering the precipitate by suction, for about 6 hours to 160° C. to 170° C. in a lead-lined autoclave in order to split off the sulfo group. After the splitting off is complete, the solution being still hot is clarified and on cooling the 2-bromo-3-chloro-4-amino-1-methyl-benzene-sulfate crystallizes out. The base is liberated from this sulfate by means of an alkali and distilled in a vacuum in order to purify it.

The mixture of 2-bromo-3-chloro-4-amino-1-methyl-benzene and 2-bromo-5-chloro-4-amino-1-methyl-benzene may be obtained in the following manner: 71 parts of chlorine are introduced into a fine suspension of 228 parts of 2-bromo-4-acetamino-1-methyl-benzene in 800 to 1000 parts of water. A mixture of 2-bromo-5-chloro-4-acetamino-1-methyl-benzene and 2-bromo-3-chloro-4-acetamino-1-methyl-benzene is obtained which is saponified by boiling it with 600 to 800 parts of sulfuric acid of 30 per cent strength. The mixture of the sulfates of the two compounds which is separated on cooling is filtered by suction. The mixture of the free bases is obtained by treating the sulfates in the usual manner with an alkali.

We claim:

1. The process which comprises heating a mixture of the two compounds of the following general formula:

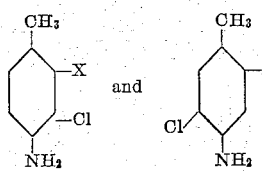

wherein each X stands for a chlorine or a bromine atom, with concentrated sulfuric acid to a temperature of about 170° C. to about 200° C., precipitating the mixture of the unchanged 2-halogen-5-chloro-4-amino-1-methylbenzene-sulfate and the resulting 2-halogen-3-chloro-4-amino-1-methylbenzene-5-sulfonic acid, separating, after the addition of alkali, the free 2-halogen-5-chloro-4-amino-1-methylbenzene from the aqueous solution of the alkali salt of the 2-halogen-3-chloro-4-amino-1-methylbenzene-5-sulfonic acid, and splitting off the sulfo group from the latter by heating it with moderately diluted sulfuric acid.

2. The process which comprises heating a mixture of 2.3-dichloro-4-amino-1-methyl-benzene and 2.5-dichloro-4-amino-1-methyl-benzene with concentrated sulfuric acid to a temperature of about 170° C. to about 200° C., precipitating the mixture of the unchanged 2.5-dichloro-4-amino-1-methylbenzene-sulfate and the resulting 2.3-dichloro-4-amino-1-methylbenzene-5-sulfonic acid, separating, after the addition of alkali, the free 2.5-dichloro-4-amino-1-methylbenzene from the aqueous solution of the alkali salt of the 2.3-dichloro-4-amino-1-methylbenzene-5-sulfonic acid, and splitting off the sulfo group from the latter by heating it with moderately diluted sulfuric acid to a temperature of about 150° C. to 170° C.

In testimony whereof, we affix our signatures.

ALBERT KISSLING.
ERNST HOTZ.
WILHELM FITZKY.